(12) United States Patent
Atarashi

(10) Patent No.: US 7,626,298 B2
(45) Date of Patent: Dec. 1, 2009

(54) ELECTRIC MOTOR AND METHOD OF DRIVING THE SAME

(75) Inventor: Hirofumi Atarashi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 11/604,329

(22) Filed: Nov. 27, 2006

(65) Prior Publication Data

US 2007/0129198 A1    Jun. 7, 2007

(30) Foreign Application Priority Data

Dec. 2, 2005    (JP)    ............... 2005-348981

(51) Int. Cl.
*H02K 16/00*  (2006.01)
*H20K 16/02*  (2006.01)

(52) U.S. Cl. ........................ 310/114; 310/83

(58) Field of Classification Search .......... 310/83, 310/112–114; 180/185, 65.5–65.6; 475/198
See application file for complete search history.

(56) References Cited

U.S. PATENT DOCUMENTS

| | | | |
|---|---|---|---|
| 5,382,854 A | 1/1995 | Kawamoto et al. | |
| 5,845,732 A | 12/1998 | Taniguchi et al. | |
| 6,302,227 B1 * | 10/2001 | Takemura et al. | ........ 180/65.25 |
| 7,259,493 B2 * | 8/2007 | Oshidari et al. | ....... 310/216.114 |

2003/0090167 A1    5/2003    Kajiura et al.

FOREIGN PATENT DOCUMENTS

| | | | |
|---|---|---|---|
| FR | 2 831 345 A | | 4/2003 |
| GB | 2 051 496 A | | 5/1979 |
| JP | 6-48192 A | | 2/1994 |
| JP | 08-282314 A | | 10/1996 |
| JP | 2001-314068 A | | 11/2001 |
| JP | 2002-204541 A | | 7/2002 |
| JP | 2004-072978 A | | 3/2004 |
| JP | 2005-080364 A | | 3/2005 |
| JP | 2005-186667 A | | 7/2005 |
| WO | 2004/040740 A1 | | 5/2004 |
| WO | 2005/100080 A1 | | 10/2005 |

* cited by examiner

*Primary Examiner*—Quyen Leung
*Assistant Examiner*—Leda Pham
(74) *Attorney, Agent, or Firm*—Arent Fox LLP

(57) ABSTRACT

This electric motor of the present invention is formed by an inner circumferential side rotor, an outer circumferential side rotor, and a planetary gear mechanism that are placed coaxially. The planetary gear mechanism is a single pinion type that includes a first planetary gear train and a second planetary gear train that are each single gear train. A first planetary carrier that supports the first planetary gear train is able to pivot around an axis of rotation, and a second planetary carrier that supports the second planetary gear train is fixed to a stator. The electric motor is further provided with an actuator that pivots the first planetary carrier by a predetermined pivot amount around the axis of rotation.

10 Claims, 11 Drawing Sheets

SAME POLARITY ARRANGEMENT: STRONG FIELD

OPPOSITE POLARITY ARRANGEMENT: WEAK FIELD

ELECTRIC MOTOR AND METHOD OF DRIVING THE SAME

BACKGROUND OF THE INVENTION

1. Field of the Invention

The present invention relates to an electric motor and to a method of driving an electric motor.

Priority is claimed on Japanese Patent Application No. 2005-348981, filed Dec. 2, 2005, the contents of which are incorporated herein by reference.

2. Description of Related Art

Conventionally, an electric motor is known in which there are provided a first and second rotors that are provided concentrically around an axis of rotation of an electric motor, and the relative positions in the circumferential direction of the first and second rotors, namely, the phase difference thereof are controlled in accordance with the rotational speed of the electric motor, or in accordance with the speed of a rotating magnetic field that is generated in a stator (see, for example, Japanese Patent Application, First Publication No. 2002-204541).

In this electric motor, when the phase difference between the first rotor and the second rotor is controlled in accordance, for example, with the rotational speed of the electric motor, the relative positions in the circumferential direction of the first and second rotors are altered via components that become displaced in a radial direction by the action of centrifugal force. If the phase difference between the first and second rotors is controlled in accordance, for example, with the speed of the rotating magnetic field that is generated in the stator, then the relative positions in the circumferential direction of the first and second rotors are altered by altering the rotating magnetic field speed by supplying a control current to the stator coil while each rotor is maintaining its rotational speed by inertia.

In an electric motor according to an example of the above described conventional technology, for example, when the phase difference between the first and second rotors is controlled in accordance, for example, with the rotational speed of the electric motor, then it is only possible to control the phase difference between the first and second rotors when the electric motor is in operation, namely, when a centrifugal force corresponding to the rotational speed is in action, and the problem arises that it is not possible to control the phase difference at a suitable timing that includes when the electric motor is stopped. Moreover, in a state in which external vibration can easily affect the electric motor, such as when the electric motor is mounted as a driving source in a vehicle, then the further problem arises that it is difficult to appropriately control the phase difference between the first and second rotors solely by the action of centrifugal force. Furthermore, in this case, because the phase difference is controlled irrespective of variations in the power supply voltage of the power supply for the motor, there is a possibility, for example, that a failure will occur such as the size relationship between the power supply voltage and the counter-electromotive force of the electric motor becoming reversed.

In addition, if, for example, the phase difference between the first and second rotors is controlled in accordance with the speed of the rotating magnetic field that is generated in the stator, then because the speed of the rotating magnetic field is altered, the problem arises that processing to control the electric motor becomes extremely complex.

SUMMARY OF THE INVENTION

The present invention was conceived in view of the above described circumstances and it is an object thereof to provide an electric motor and a method of driving an electric motor in which, by making it possible to easily and appropriately vary an induced voltage constant without making the electric motor any more complex, the range of the rotational speed and the range of torque where operation is possible is enlarged and the operating efficiency is improved. In addition, the range where highly efficient operation is possible is enlarged.

In order to solve the above described problems and achieve the desired objects, the electric motor of the present invention includes: a substantially toroidal inner circumferential side rotor and an outer circumferential side rotor that are positioned so as to have the same axis of rotation and are equipped with permanent magnets that are arranged in a circumferential direction; a planetary gear mechanism having: a first ring gear that is formed coaxially and integrally with the outer circumferential side rotor, a second ring gear that is formed coaxially and integrally with the inner circumferential side rotor, a first planetary gear that meshes with the first ring gear, a second planetary gear that meshes with the second ring gear, a sun gear that meshes with the first planetary gear and the second planetary gear, and a first planetary carrier that rotatably supports one of the first planetary gear and the second planetary gear and that is able to pivot around the axis of rotation; and a pivot device that is connected to the first planetary carrier and that, by pivoting the first planetary carrier by a predetermined pivot amount around the axis of rotation, alters a relative phase between the inner circumferential side rotor and the outer circumferential side rotor.

According to the electric motor having the above described structure, firstly, by positioning permanent magnets around the circumferential direction of the inner circumferential side rotor and the outer circumferential side rotor, it is possible to efficiently increase or decrease the linkage magnetic flux amount of the magnetic field flux linking with the stator coil from, for example, the permanent magnets of the outer circumferential side rotor using the magnetic field flux from the permanent magnets of the inner circumferential side rotor. In addition, in a strong field state, the torque constant (namely, torque/phase current) of the electric motor can be set to a relatively high value, and the maximum torque value that can be output by the electric motor can be increased without reducing the current loss when the electric motor is in operation and without altering the maximum value of the output current from an inverter that controls the supply of current to the stator coil.

Moreover, as a result of the first planetary gears second planetary gears being able to rotate around the respective planetary axes of rotation and meshing with the sun gear, which is an idler gear, then irrespective of whether the inner circumferential side rotor and outer circumferential side rotor are being operated in synchronization or whether the electric motor is stopped, it is possible to easily alter the relative phase between the inner circumferential side rotor and the outer circumferential side rotor.

By employing a structure in which the sun gear is shared by both the first planetary gear train and the second planetary gear train, friction in the sun gear can be reduced. As a result, irrespective of the rotational speed or torque size of the electric motor, the force that is required to restrict the pivoting (namely, to hold it in a predetermined pivot position) or, alternatively, to drive the pivoting of the first planetary carrier around the axis of rotation only needs to be larger than the attracting force or repelling force generated between the permanent magnets. Accordingly, the phase can be efficiently controlled without a larger force than the torque being output by the electric motor being required as is the case, for example, with a brake actuator.

It is also possible for the electric motor to be further provided with a second planetary carrier that rotatably supports the other one of the first planetary gear and the second planetary gear, and for the second planetary carrier to be fixed to a stator.

According to an electric motor having the above described structure, because the second planetary carrier is fixed to the stator, when the first planetary carrier that supports one of the first planetary gear and the second planetary gear is pivoted around the axis of rotation, the other one of the first planetary gear and the second planetary gear rotates around the planetary axis of rotation.

As a result, one of the inner circumferential side rotor and the outer circumferential side rotor pivots around an axis of rotation relatively to the other one, and the relative phase between the inner circumferential side rotor and the outer circumferential side rotor can be altered easily and appropriately.

In the above described electric motor, it is also possible for the first planetary gear and the second planetary gear to each be formed by a single gear train, and for the planetary gear mechanism to be a single pinion type of planetary gear mechanism.

According to an electric motor having the above described structure, it is possible to easily and appropriately alter the relative phase between the inner circumferential side rotor and the outer circumferential side rotor while preventing the structure of the planetary gear mechanism becoming more complex.

In the above described electric motor, it is also possible for the first planetary gear and the second planetary gear to each be formed by two gear trains that mesh with each other, and for the planetary gear mechanism to be a double pinion type of planetary gear mechanism.

According to an electric motor having the above described structure, the rotation directions of the inner circumferential side rotor and outer circumferential side rotor and the sun gear can be set to the same direction. Accordingly, when the electric motor is mounted in a vehicle as a driving source, for example, it is possible to prevent a power transmission mechanism such as a gearbox or the like from being made more complex even if the output shaft of the electric motor is connected to the sun gear in addition to the inner circumferential side rotor or the outer circumferential side rotor.

In the above described electric motor, it is also possible for the pivot device to be an actuator that causes the first planetary carrier to pivot or restricts the pivoting of the first planetary carrier using hydraulic or electric power.

According to an electric motor having the above described structure, the pivot device is an actuator that is equipped, for example, with a hydraulic pump or an electric motor or the like, and that pivots the planetary carrier by a predetermined pivot amount around the axis of rotation using hydraulic or electric power, or, alternatively, holds the planetary carrier in a predetermined pivot position around the axis of rotation in resistance to the attracting force or repelling force between the permanent magnets of the inner circumferential side rotor and the outer circumferential side rotor.

In the above described electric motor, it is also possible for the predetermined pivot amount to be a mechanical angle $\theta$ (°)=(180/p)×g/(1+g) that is based on a pole pairs "p" of the electric motor and a gear ratio "g" of the sun gear to one of the first ring gear and the second ring gear.

According to an electric motor having the above described structure, as a result of the predetermined pivot amount when the first planetary carrier that supports one of the first planetary gear and the second planetary gear is pivoted around the axis of rotation being set to a mechanical angle $\theta$ (°)=(180/p)×g/(1+g), the state of the electric motor can be adjusted appropriately, for example, between a strong field state in which the permanent magnets of the inner circumferential side rotor and the permanent magnets of the outer circumferential side rotor are positioned with the opposite magnetic pole facing each other (namely, the permanent magnets of the inner circumferential side rotor and the permanent magnets of the outer circumferential side rotor are positioned with the same polarity arrangement) and a weak field state in which the permanent magnets of the inner circumferential side rotor and the permanent magnets of the outer circumferential side rotor are positioned with the same magnetic pole facing each other (namely, the permanent magnets of the inner circumferential side rotor and the permanent magnets of the outer circumferential side rotor are positioned with an opposite polarity arrangement).

As a result of the first planetary carrier being pivoted by the pivot device, a state of the electric motor can be set to an appropriate state ranging between a weak field state in which the permanent magnets of the inner circumferential side rotor and the permanent magnets of the outer circumferential side rotor are positioned with the same magnetic pole facing each other and a strong field state in which the permanent magnets of the inner circumferential side rotor and the permanent magnets of the outer circumferential side rotor are positioned with the opposite magnetic pole facing each other.

According to an electric motor having the above described structure, it is possible to continuously change the size of the magnetic field flux that links with the stator coil, and it is possible to continuously change the induced voltage constant of the electric motor to an appropriate value. As a result, the rotational speed and torque value at which the electric motor can operate can be altered continuously, and the range of the speed and torque value at which operation is possible can be enlarged. Furthermore, the maximum value of the operating efficiency of the electric motor can be increased, and the high efficiency region where the operating efficiency is greater than a predetermined efficiency can be enlarged.

It is also possible for the electric motor to be further provided with a terminating device that terminates the restricting by the pivot device of the pivoting of the first planetary carrier around the axis of rotation, and enables the planetary carrier to pivot around the axis of rotation until the state of the electric motor reaches a strong field state in which the permanent magnets of the inner circumferential side rotor and the permanent magnets of the outer circumferential side rotor are positioned with the opposite magnetic pole facing each other. The above described pivot device may also perform the functions of this terminating device.

According to an electric motor having the above described structure, the restricting of the pivoting of the first planetary carrier around the axis of rotation by the pivot device is terminated by the terminating device, so that the first planetary carrier is able to pivot freely around the axis of rotation. As a result, the relative positions in the circumferential direction of the inner circumferential side rotor and the outer circumferential side rotor are changed by the repelling force between the same magnetic poles of the permanent magnets of the inner circumferential side rotor and the permanent magnets of the outer circumferential side rotor or, alternatively, by the attracting force between the opposite magnetic poles of the permanent magnets of the inner circumferential side rotor and the permanent magnets of the outer circumferential side rotor. The state of the electric motor accordingly changes to a strong field state in which the opposite magnetic poles of the permanent magnets of the inner circumferential side rotor and the permanent magnets of the outer circumferential side rotor are made to face each other.

In the above described electric motor, it is also possible for the planetary gear mechanism to be positioned in a hollow portion on an inner circumferential side of the inner circumferential side rotor.

The method of driving an electric motor of the present invention is a method of driving the above described electric motor, including the steps of: detecting a phase at a relative electrical angle between the inner circumferential side rotor and the outer circumferential side rotor; converting the phase at the electrical angle into a phase at a mechanical angle; calculating the predetermined pivot amount from the phase at the mechanical angle; and pivoting the first planetary carrier by the predetermined pivot amount around the axis of rotation by the pivot device.

According to the above described method of driving an electric motor, irrespective of whether the inner circumferential side rotor and the outer circumferential side rotor are operating in synchronization with each other or whether the electric motor is stopped, it is possible to easily set the state of the electric motor in a range between a weak field state in which the permanent magnets of the inner circumferential side rotor and the permanent magnets of the outer circumferential side rotor are positioned with the same magnetic pole facing each other and a strong field state in which the permanent magnets of the inner circumferential side rotor and the permanent magnets of the outer circumferential side rotor are positioned with the opposite magnetic pole facing each other.

In the above described method of driving an electric motor, it is also possible to further include the step of, when a fault is detected in the electric motor, terminating the restricting by the pivot device of the pivoting of the first planetary carrier around the axis of rotation, such that the first planetary carrier is allowed to pivot around the axis of rotation until the state of the electric motor reaches a strong field state in which the permanent magnets of the inner circumferential side rotor and the permanent magnets of the outer circumferential side rotor are positioned with the opposite magnetic pole facing each other.

According to the above described method of driving an electric motor, if the restricting by the pivot device is terminated, the first planetary carrier is able to pivot freely around the axis of rotation. Namely, when a fault is detected in the electric motor, the relative positions in the circumferential direction of the inner circumferential side rotor and the outer circumferential side rotor are changed by the repelling force between the same magnetic poles of the permanent magnets of the inner circumferential side rotor and the permanent magnets of the outer circumferential side rotor or, alternatively, by the attracting force between the opposite magnetic poles of the permanent magnets of the inner circumferential side rotor and the permanent magnets of the outer circumferential side rotor. The state of the electric motor accordingly changes to a strong field state in which the opposite magnetic poles of the permanent magnets of the inner circumferential side rotor and the permanent magnets of the outer circumferential side rotor are made to face each other.

As a result, when, for example, the electric motor is mounted in a vehicle as a driving source, it is possible to secure the desired output to enable the vehicle to start moving or continue traveling.

In the above described method of driving an electric motor, it is also possible when a command to execute weak field control is detected for the first planetary carrier to be pivoted around the axis of rotation such that the state of the electric motor begins to change to a weak field state in which the permanent magnets of the inner circumferential side rotor and the permanent magnets of the outer circumferential side rotor are positioned with the same magnetic pole facing each other.

According to the above described method of driving an electric motor, if, for example, a command to execute weak field control in accordance with the rotational speed and power supply voltage or the like of the electric motor is output from an external control unit or the like, then the first planetary carrier is pivoted around the axis of rotation such that the electric motor changes to a weak field state in which the permanent magnets of the inner circumferential side rotor and the permanent magnets of the outer circumferential side rotor are positioned with the same magnetic pole facing each other. Accordingly, it is possible to prevent a high voltage device such as, for example, an inverter that controls the supply of power to the stator coil being placed in an over-voltage state.

BRIEF DESCRIPTION OF THE REFERENCE NUMERALS

Figure 1:
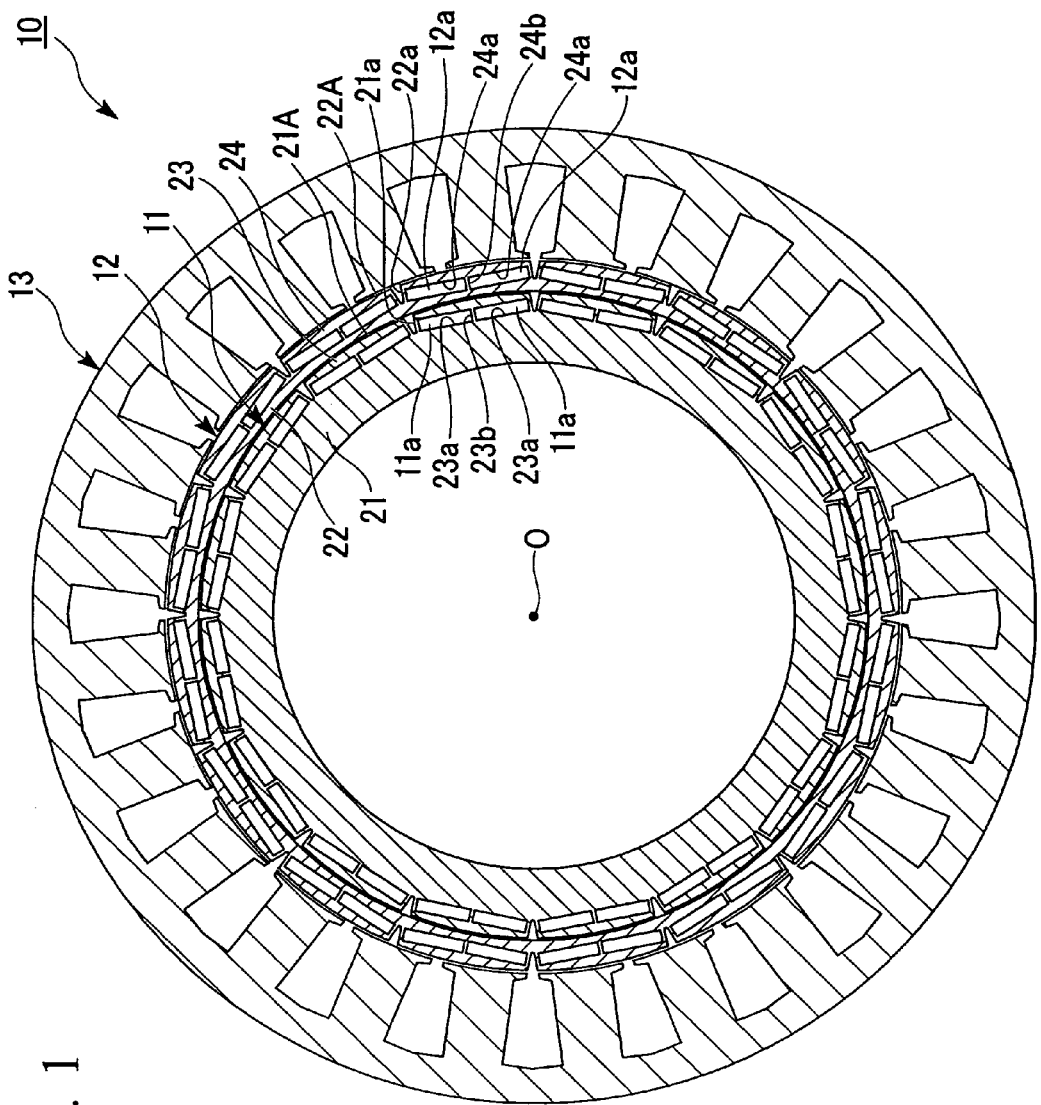
FIG. 1 is a cross-sectional view showing principal portions of an inner circumferential side rotor and outer circumferential side rotor and a stator of an electric motor according to an embodiment of the present invention.

10 Electric motor
11 Inner circumferential side rotor
11a Permanent magnet
12 Outer circumferential side rotor
12a Permanent magnet
15 Actuator (Pivot device, terminating device)
31 First ring gear (R1)
32 Second ring gear (R2)
33, 51, 52 First planetary gear train (First planetary gear)
34, 53, 54 Second planetary gear train (Second planetary gear)
36 First planetary carrier (C1) (Planetary carrier)
37 Second planetary carrier (C2)

DETAILED DESCRIPTION OF THE PREFERRED EMBODIMENTS

An embodiment of an electric motor and a method of driving an electric motor of the present invention will now be described with reference to the attached drawings.

Figure 2:
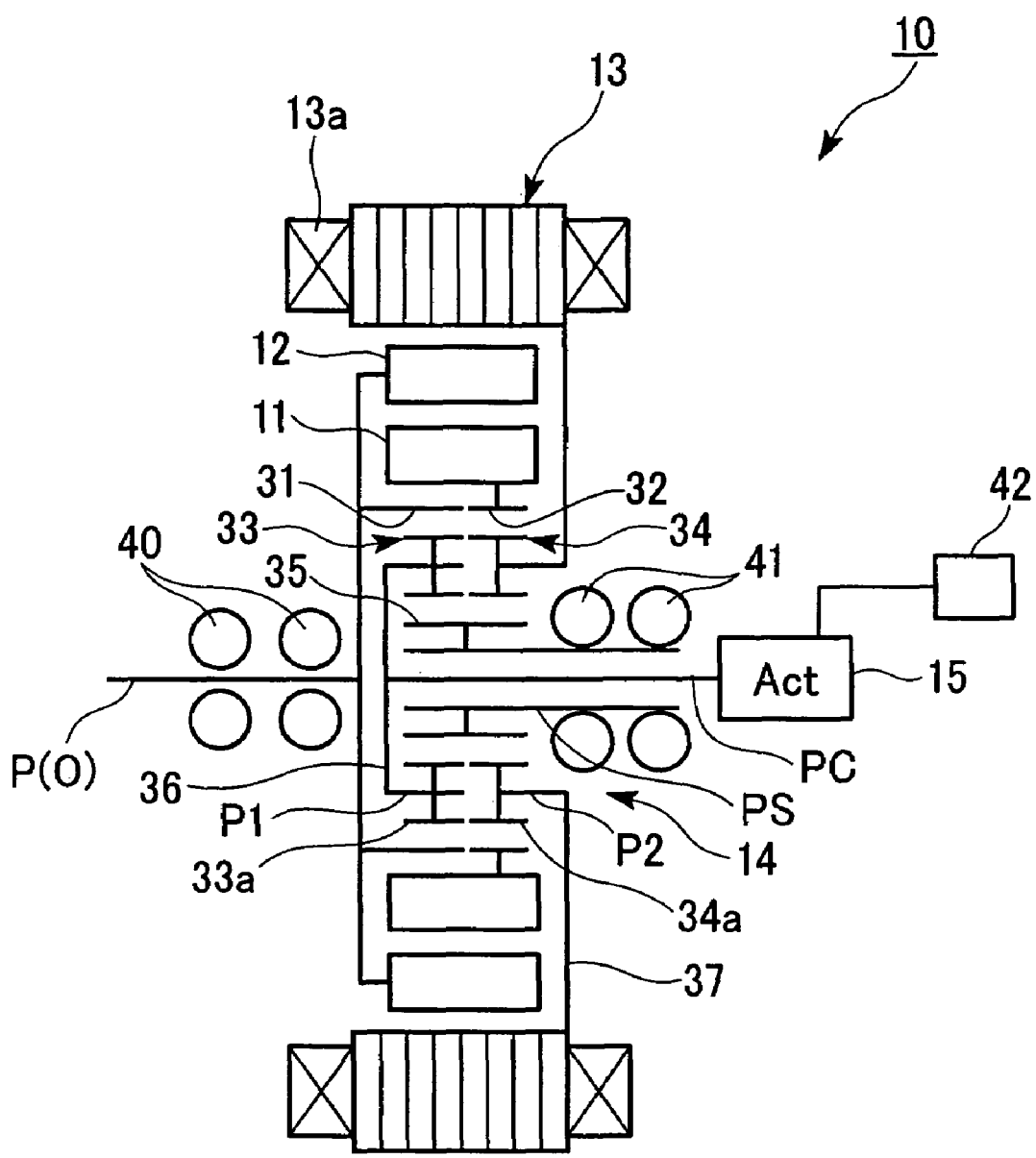
FIG. 2 is a view showing in typical form the structure of the electric motor according to the embodiment of the present invention.

As is shown in FIGS. 1 and 2, for example, an electric motor 10 according to the present embodiment is a brushless DC motor that is provided with a substantially toroidal inner circumferential side rotor (hereinafter, inner rotor) 11 that is equipped with permanent magnets 11a that are lined up in a circumferential direction, a substantially toroidal outer circumferential side rotor (hereinafter, outer rotor) 12 that is equipped with permanent magnets 12a that are lined up in a circumferential direction, a stator 13 that has a plurality of phases of stator coil 13a that generate a rotating magnetic field causing the inner rotor 11 and the outer rotor 12 to rotate, a planetary gear mechanism 14 that is connected to the inner rotor 11 and the outer rotor 12, and an actuator 15 that sets relative phases between the inner rotor 11 and the outer rotor 12 using the planetary gear mechanism 14. The electric motor 10 is mounted as a driving source in a vehicle such as a hybrid vehicle or electric vehicle. An output shaft P of the electric motor 10 is connected to an input shaft of a transmission (not shown), and drive force from the electric motor 10 is transmitted to a drive wheel (not shown) of the vehicle via the transmission.

When the vehicle is decelerating and drive force is transmitted from the drive wheel side to the electric motor 10 side, the electric motor 10 functions as an electricity generator to generate what is known as regenerative braking force in which the kinetic energy of the vehicle is absorbed as electrical energy (i.e., regenerative energy). Furthermore, in a hybrid vehicle, for example, by linking the output shaft P of the electric motor 10 to a crankshaft of an internal combustion engine (not shown), the electric motor 10 also functions as a generator so as to generate electrical energy when output from the internal combustion engine is being transmitted to the electric motor 10.

As is shown in FIG. 1, for example, the inner rotor 11 and the outer rotor 12 are positioned such that the axis of rotation of each rotor is coaxial with an axis of rotation O of the electric motor 10. The inner rotor 11 is provided with a substantially cylindrical rotor iron core 21, and a plurality of inner circumferential side magnet mounting portions (hereinafter, inner magnet mounting portions) 23 that are provided at a predetermined spacing in the circumferential direction on an outer circumferential portion of the inner circumferential side rotor iron core (hereinafter, inner rotor iron core) 21. The outer rotor 12 is provided with a substantially cylindrical rotor iron core 22, and a plurality of outer circumferential side magnet mounting portions (hereinafter, outer magnet mounting portions) 24 that are provided at a predetermined spacing in the circumferential direction on an inner portion of the outer circumferential side rotor iron core (hereinafter, outer rotor iron core) 22.

Recessed grooves 21a that extend parallel with the axis of rotation O are formed on an outer circumferential surface 21A of the inner rotor iron core 21 between adjacent inner magnet mounting portions 23 in the circumferential direction.

Recessed grooves 22a that extend parallel with the axis of rotation O are formed on an outer circumferential surface 22A of the outer rotor iron core 22 between adjacent outer magnet mounting portions 24 in the circumferential direction.

The inner magnet mounting portions 23 are provided with a pair of magnet mounting holes 23a that penetrate, for example, in parallel with the axis of rotation O. The pair of magnet mounting holes 23a are placed so as to be adjacent to each other in the circumferential direction sandwiching a center rib 23b. The outer magnet mounting portions 24 are provided with a pair of magnet mounting holes 24a that penetrate, for example, in parallel with the axis of rotation O. The pair of magnet mounting holes 24a are placed so as to be adjacent to each other in the circumferential direction sandwiching a center rib 24b.

The cross section in a direction parallel to the axis of rotation O of each magnet mounting hole 23a is formed in a substantially rectangular shape. The substantially plate-shaped permanent magnet 11a that extends in parallel with the axis of rotation O is mounted in each magnet mounting hole 23a. The cross section in a direction parallel to the axis of rotation O of each magnet mounting hole 24a is formed in a substantially rectangular shape. The substantially plate-shaped permanent magnet 12a that extends in parallel with the axis of rotation O is mounted in each magnet mounting hole 24a.

The pair of permanent magnets 11a that are mounted in the pair of magnet mounting holes 23a are magnetized in the thickness direction thereof (namely, in the radial directions of the respective rotors 11 and 12), and are set such that the magnetization direction is the same direction in each one. In circumferentially adjacent inner magnet mounting portions 23, the permanent magnets 11a that are mounted in the respective magnet mounting holes 23a are set such that the magnetization direction is different in each one. Namely, the inner magnet mounting portions 23 in which the pair of permanent magnets 11a whose outer circumferential side has an S polarity are mounted are adjacent in the circumferential direction via the recessed grooves 21a to the inner magnet mounting portions 23 in which the pair of permanent magnets 11a whose outer circumferential side has an N polarity are mounted.

In the same way, the pair of permanent magnets 12a that are mounted in the pair of magnet mounting holes 24a are magnetized in the thickness direction thereof (namely, in the radial directions of the respective rotors 11 and 12), and are set such that the magnetization direction is the same direction in each one. In circumferentially adjacent outer magnet mounting portions 24, the permanent magnets 12a that are mounted in the respective magnet mounting holes 24a are set such that the magnetization direction is different in each one. Namely, the outer magnet mounting portions 24 in which the pair of permanent magnets 12a whose outer circumferential side has an S polarity are mounted are adjacent in the circumferential direction via the recessed grooves 22a to the outer magnet mounting portions 24 in which the pair of permanent magnets 12a whose outer circumferential side has an N polarity are mounted.

The respective magnet mounting portions 23 of the inner rotor 11 and the respective magnet mounting portions 24 of the outer rotor 12 are placed so as to be able to be positioned facing each other in the radial direction of the respective rotors 11 and 12. Furthermore, the respective recessed grooves 21a of the inner rotor 11 and the respective recessed grooves 22a of the outer rotor 12 are placed so as to be able to be positioned facing each other in the radial direction of the respective rotors 11 and 12.

As a result, in accordance with the relative positions around the axis of rotation O of the inner rotor 11 and the outer rotor 12, the state of the electric motor 10 can be set to an appropriate state ranging between a weak field state in which the permanent magnets 11a of the inner rotor 11 and the permanent magnets 12a of the outer rotor 12 are positioned with the same magnetic pole facing each other (namely, the permanent magnets 11a and the permanent magnets 12a are positioned with an opposite polarity arrangement) and a strong field state in which the permanent magnets 11a of the inner rotor 11 and the permanent magnets 12a of the outer rotor 12 are positioned with the opposite magnetic pole facing each other (namely, the permanent magnets 11a and the permanent magnets 12a are positioned with the same polarity arrangement).

The stator 13 is formed in a substantially cylindrical shape so as to face the outer circumferential portions of the outer rotor 12 and is fixed, for example, to a transmission housing (not shown) or the like of a vehicle.

As is shown in FIG. 2, for example, the planetary gear mechanism 14 is constructed so as to include: a first ring gear (R1) 31 that is placed in a hollow portion on the inner circumferential side of the inner rotor 11 and is formed coaxially and integrally with the outer rotor 12; a second ring gear (R2) 32 that is formed coaxially and integrally with the inner rotor 11; a first planetary gear train 33 that is a single gear train that meshes with the first ring gear (R1) 31; a second planetary gear train 34 that is a single gear train that meshes with the second ring gear (R2) 32; a sun gear (S) 35 that is an idler gear that meshes with the first planetary gear train 33 and the second planetary gear train 34; a first planetary carrier (C1) 36 that supports one of the first planetary gear train 33 and the second planetary gear train 34, for example, supports a plurality of first planetary gears 33a that constitute the first planetary gear train 33 such that they can rotate around respective first planetary rotation shafts P1, and that is able to pivot around the axis of rotation O; and a second planetary carrier (C2) 37 that supports the other one of the first planetary gear train 33 and the second planetary gear train 34, for example, supports a plurality of second planetary gears 34a that constitute the second planetary gear train 34 such that they can rotate around respective second planetary rotation shafts P2, and that is fixed to the stator 13.

Namely, the planetary gear mechanism 14 is a single pinion type of planetary gear mechanism that is provide with the first planetary gear train 33 and the second planetary gear train 34 that are each single gear trains.

In the planetary gear mechanism 14, the outer diameter of the inner rotor 11 is formed smaller than the inner diameter of the outer rotor 12, and the inner rotor 11 is positioned in the hollow portion on the inner circumferential side of the outer rotor 12. The respective outer diameters of the first ring gear (R1) 31 and the second ring gear (R2) 32 are formed smaller than the inner diameter of the inner rotor 11. The first ring gear (R1) 31 and the second ring gear (R2) 32 are coaxially positioned so as to be adjacent to each other in a direction parallel to the axis of rotation O, and are positioned in the hollow portion on the inner circumferential side of the inner rotor 11.

The first ring gear (R1) 31 that is placed in a position shifted to one side (i.e., to the left side in the drawing) in a direction parallel to the axis of rotation O relative to the placement position of the second ring gear (R2) 32 is connected to the output shaft P that is rotatably supported by bearings 40 and that extends towards the left side.

The first planetary carrier (C1) 36 is placed in a position shifted to one side (i.e., to the left side) in a direction parallel to the axis of rotation O relative to the placement position of the first planetary gear train 33 that meshes with the first ring gear (R1) 31, and is connected to a rotation shaft PC that rotatably penetrates a hollow portion of a rotation shaft PS of the hollow sun gear (S) 35 and that extends towards the other side (i.e., towards the right side in the drawing).

The second planetary carrier (C2) 37 is placed in a position shifted to the right side in a direction parallel to the axis of rotation O relative to the placement position of the second planetary gear train 34 that meshes with the second ring gear (R2) 32.

In the planetary gear train 14, the first ring gear (R1) 31 and the second ring gear (R2) 32 are formed in substantially the same gear shape. In addition, each of the plurality of first planetary gears 33a that constitute the first planetary gear train 33 and each of the plurality of second planetary gears 34a that constitute the second planetary gear train 34 are formed in substantially the same gear shape. The rotation shaft PS of the sun gear (S) 35 is positioned coaxially with the axis of rotation O of the electric motor 10 and is also rotatably supported by bearings 41. Accordingly, as a result of the first planetary gear train 33 and the second planetary gear train 34 meshing with the sun gear (S) 35, which is an idler gear, the inner rotor 11 and the outer rotor 12 are rotated in synchronization.

Furthermore, the rotation shaft PC of the first planetary carrier (C1) 36 is positioned coaxially with the axis of rotation O of the electric motor 10, and is also connected to the actuator 15. The second planetary carrier (C2) 37 is fixed to the stator 13.

The actuator 15 is, for example, provided with a hydraulic pump that converts fluid energy into rotational motion which is controlled in accordance with control commands that are input from an external control unit 42 or the like. The actuator 15 restricts the pivoting of the first planetary carrier (C1) 36 around the axis of rotation O (namely, holds the first planetary carrier (C1) 36 in a predetermined pivot position), or alternatively pivots the first planetary carrier (C1) 36 by a predetermined pivot amount in a forward rotation direction or reverse rotation direction around the axis of rotation O using an advance angle operation or a retard angle operation. As a result, when the first planetary carrier (C1) 36 is pivoted around the axis of rotation O by the actuator 15, then irrespective of whether the electric motor 10 is in an operating state or a stopped state, the relative phase between the inner rotor 11 and the outer rotor 12 changes.

Figure 3:
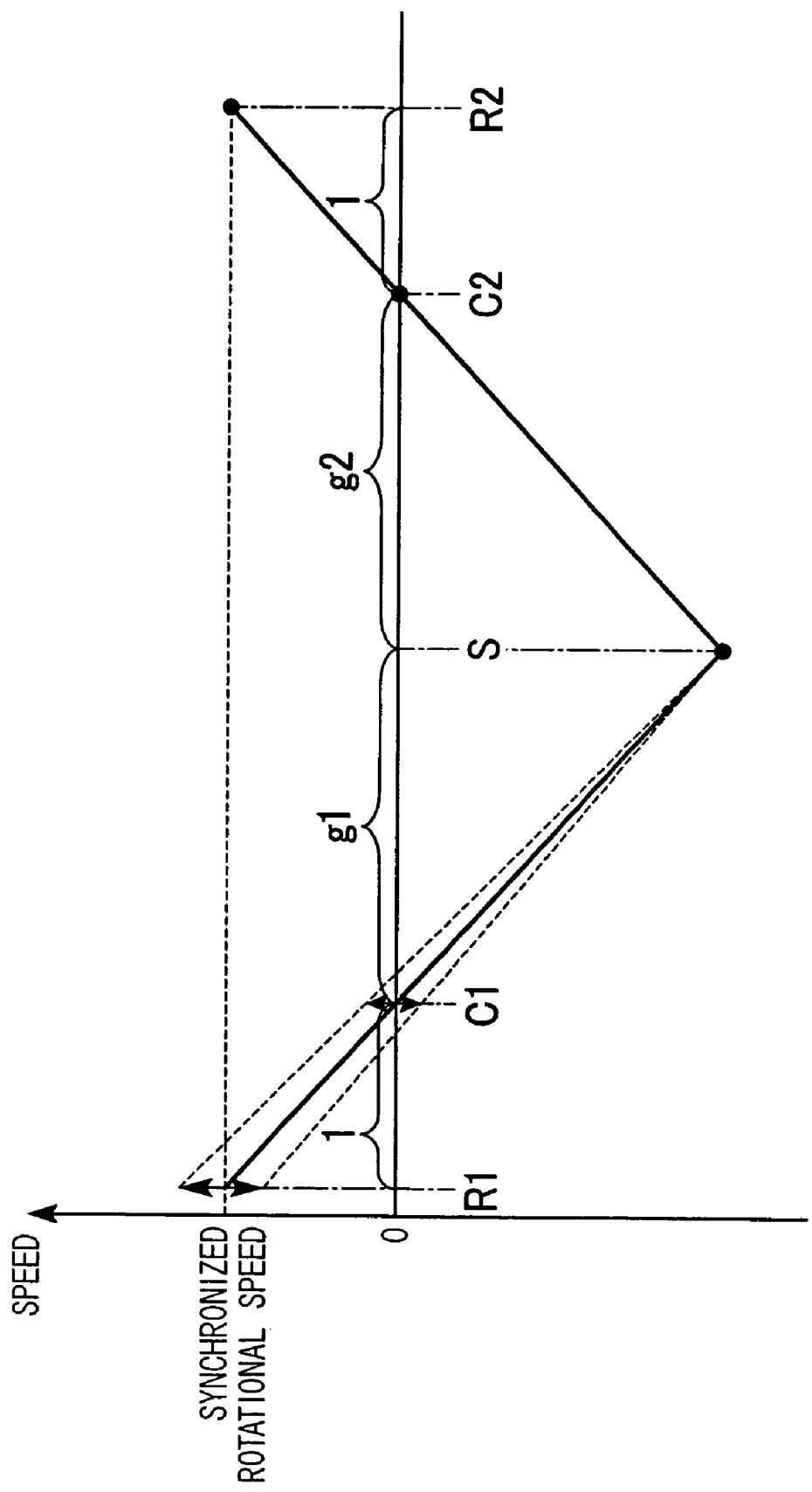
FIG. 3 is a velocity diagram of a planetary gear mechanism according to the embodiment of the present invention.

For example, as is shown by the rotation state of the sun gear (S) 35 in FIG. 3, the speed of the second planetary carrier (C2) 37 relative to a rotation around the axis of rotation O is zero irrespective of the operating state of the actuator 15. Because of this, for example, with respect to the sun gear (S) 35 that rotates at an appropriate speed in the reverse rotation direction, the second ring gear (R2) 32 and the inner rotor 11 rotate in the forward rotation direction at a speed corresponding to a gear ratio (namely, the speed increase ratio) g2 of the sun gear (S) 35 relative to the second ring gear (R2) 32.

The speed of the first planetary carrier (C1) 36 relative to a rotation around the axis of rotation O is zero when the actuator 15 is not operated. Therefore, for example, with respect to the sun gear (S) 35 that rotates at an appropriate speed in the reverse rotation direction, the first ring gear (R1) 31 and the outer rotor 12 rotate in the forward rotation direction at a speed corresponding to a gear ratio (namely, the speed increase ratio) g1 of the sun gear (S) 35 relative to the first ring gear (R1) 31. Here, because the gear ratio g1 and the gear ratio g2 are substantially equal (i.e., g1≈g2), the inner rotor 11 and the outer rotor 12 rotate in synchronization and the relative phase between the inner rotor 11 and the outer rotor 12 is not changed and is maintained.

In contrast, when the actuator 15 is in a running state (namely, when an advance angle operation or retard angle operation is being executed), the speed of the first planetary carrier (C1) 36 relative to a rotation around the axis of rotation O is a value other than zero and is an appropriate positive value or a negative value corresponding to a forward rotation direction or a reverse rotation direction. Because of this, for example, with respect to the sun gear (S) 35 that rotates at an appropriate speed in the reverse rotation direction, the first ring gear (R1) 31 and the outer rotor 12 rotate in the forward rotation direction at a faster speed or slower speed than a speed corresponding to the gear ratio (namely, the speed increase ratio) g1 of the sun gear (S) 35 relative to the first ring gear (R1) 31. Here, because the gear ratio g1 and the gear ratio g2 are substantially equal (i.e., g11≈g2), the speed of the outer rotor 12 is increased or decreased than the inner rotor 11 and the relative phase between the inner rotor 11 and the outer rotor 12 changes.

For the gear ratio (namely, the speed increase ratio) g1 of the sun gear (S) 35 relative to the first ring gear (R1) 31 and a pole pairs "p" of the electric motor 10, the actuator 15 is able to rotate the first planetary carrier (C1) 36 around the axis of rotation O in a forward rotation direction or reverse rotation direction by at least a mechanical angle $\theta$ (°)=(180/p)×g1/(1+g1).

As a result, the relative phase between the inner rotor 11 and the outer rotor 12 can be changed to the advance angle side or the retard angle side by at least an electrical angle of 180°, and the state of the electric motor 10 can be appropriately set in a range between a weak field state in which the permanent magnets 11a of the inner rotor 11 and the permanent magnets 12a of the outer rotor 12 are positioned with the same magnetic pole facing each other (namely, the permanent magnets 11a and the permanent magnets 12a are positioned with an opposite polarity arrangement) and a strong field state in which the permanent magnets 11a of the inner rotor 11 and the permanent magnets 12a of the outer rotor 12 are positioned with the opposite magnetic pole facing each other (namely, the permanent magnets 11a and the permanent magnets 12a are positioned with the same polarity arrangement).

Figure 4A:
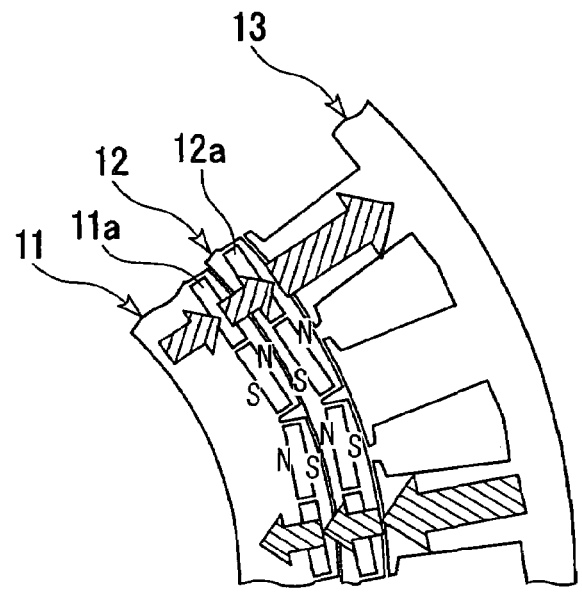
FIG. 4A is a view showing in typical form a strong field state in which permanent magnets of the inner circumferential side rotor and permanent magnets of the outer circumferential side rotor are positioned with the same polarity arrangement.
Figure 4B:
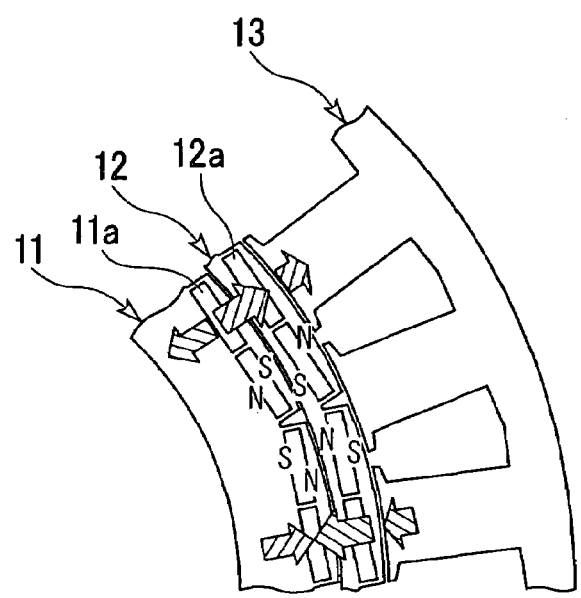
FIG. 4B is a view showing in typical form a weak field state in which permanent magnets of the inner circumferential side rotor and permanent magnets of the outer circumferential side rotor are positioned with an opposite polarity arrangement.
Figure 5:
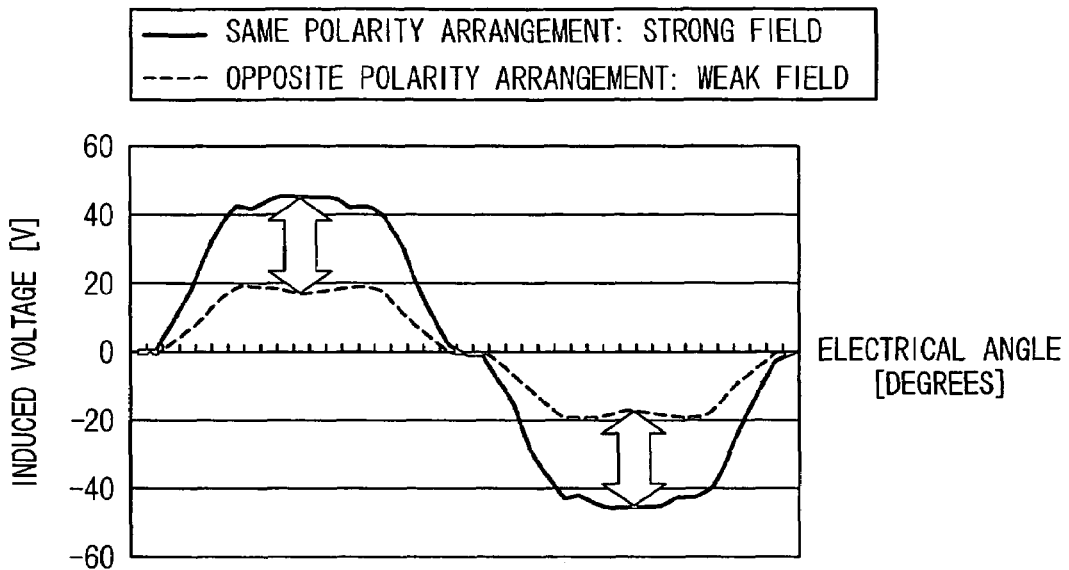
FIG. 5 is a graph showing induced voltages in the strong field state and the weak field state shown in FIG. 4.

In a strong field state shown in FIG. 4A, for example, in which the permanent magnets 11a of the inner rotor 11 and the permanent magnets 12a of the outer rotor 12 are positioned with an same polarity arrangement, and a weak field state shown in FIG. 4B, for example, in which the permanent magnets 11a of the inner rotor 11 and the permanent magnets 12a of the outer rotor 12 are positioned with the opposite polarity arrangement, the size of the induced voltage changes, for example, as is shown in FIG. 5. Accordingly, by changing the state of the electric motor 10 between a strong field state and a weak field state, the induced voltage constant Ke is altered.

The induced voltage constant Ke is, for example, a ratio relative to the rotational speed of the induced voltage that is induced in the coil end of the stator coil 13a by the rotation of the respective rotors 11 and 12 and can be described by the product of the pole pairs "p", motor outer diameter R, motor thickness of lamination L, magnetic flux density B, and number of turns T as Ke=8×p×R×L×B×T×π. By changing the state of the electric motor 10 between a strong field state and a weak field state, the size of the magnetic flux density B of the magnetic field flux from the permanent magnets 11a of the inner rotor 11 and the permanent magnets 12a of the outer rotor 12 changes, and the induced voltage constant Ke is altered.

Figure 6A:
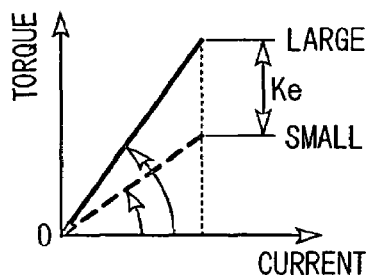
FIG. 6A is a graph showing a relationship between current and torque of an electric motor that change in accordance with an induced voltage constant Ke.

Here, as is shown in FIG. 6A, for example, the torque of the electric motor 10 is proportional to the product of the induced voltage constant Ke and the current that is supplied to the stator coil 13a (i.e., torque ∝ (Ke×current)).

Figure 6B:
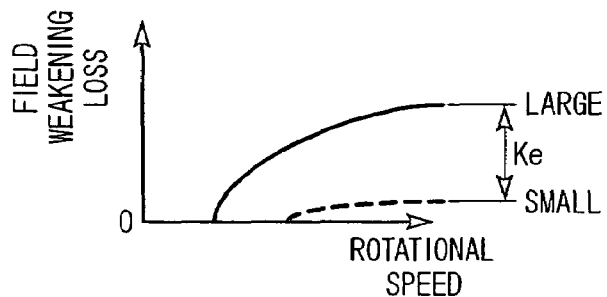
FIG. 6B is a graph showing a relationship between a rotational speed and field weakening loss of an electric motor that change in accordance with an induced voltage constant Ke.

Moreover, as is shown in FIG. 6B, for example, because a field weakening loss of the electric motor 10 is proportional to the product of the induced voltage constant Ke and the rotational speed (i.e., field weakening loss ∝ (Ke×rotational speed)), the permitted rotational speed of the electric motor 10 is proportional to the inverse of the product of the induced voltage constant Ke and the rotational speed (i.e., permitted rotational speed ∝ (1/(Ke×rotational speed))).

Figure 7:
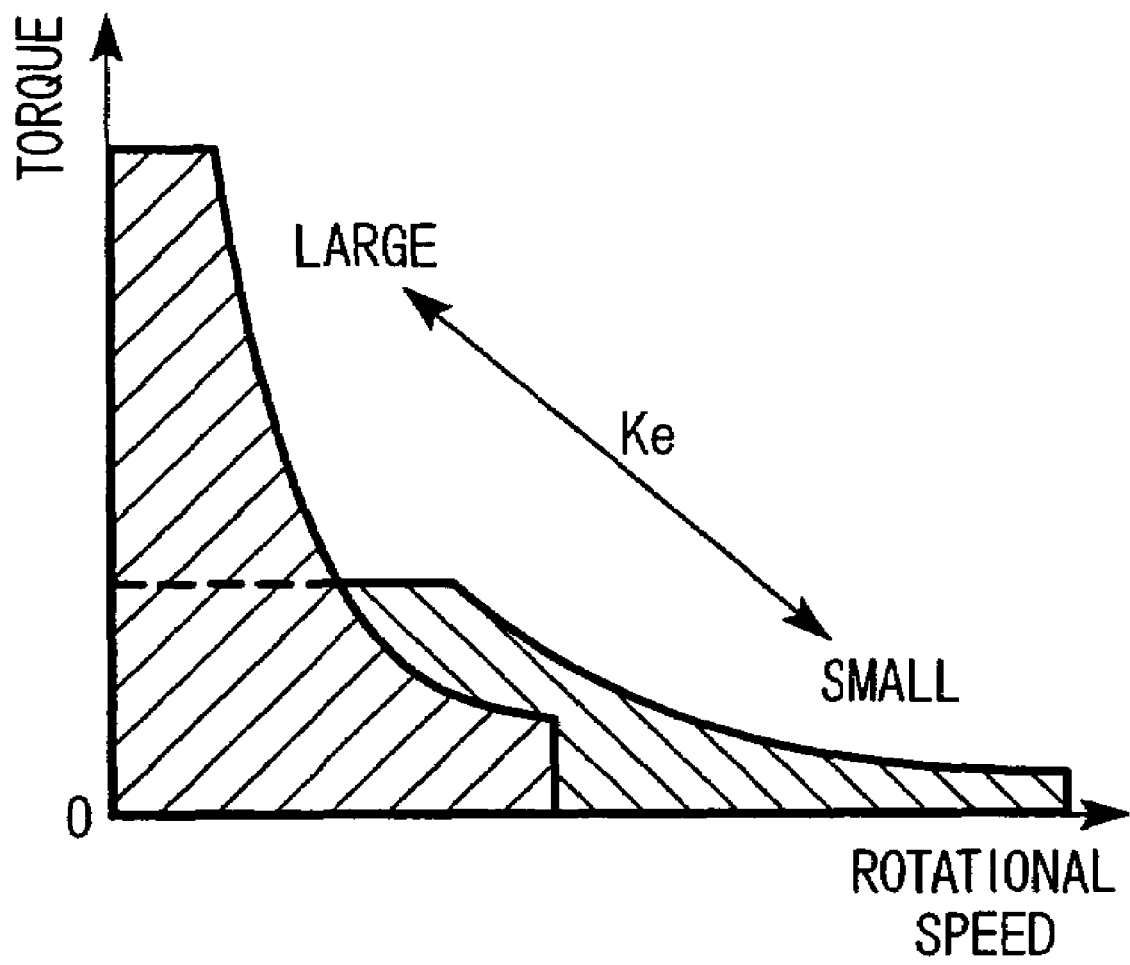
FIG. 7 is a view showing an operable area for rotational speed and torque of an electric motor that change in accordance with an induced voltage constant Ke.

Namely, as is shown in FIG. 7, for example, in an electric motor 10 in which the induced voltage constant Ke is relatively large, although the operable rotational speed is relatively reduced, it becomes possible to output a relatively large torque. On the other hand, in an electric motor 10 in which the induced voltage constant Ke is relatively small, although the torque that can be output is relatively reduced, it becomes possible to operate up to a relatively high rotational speed. Thus, the operable ranges of the torque and the rotational speed change in accordance with the induced voltage constant Ke.

Figure 8A:
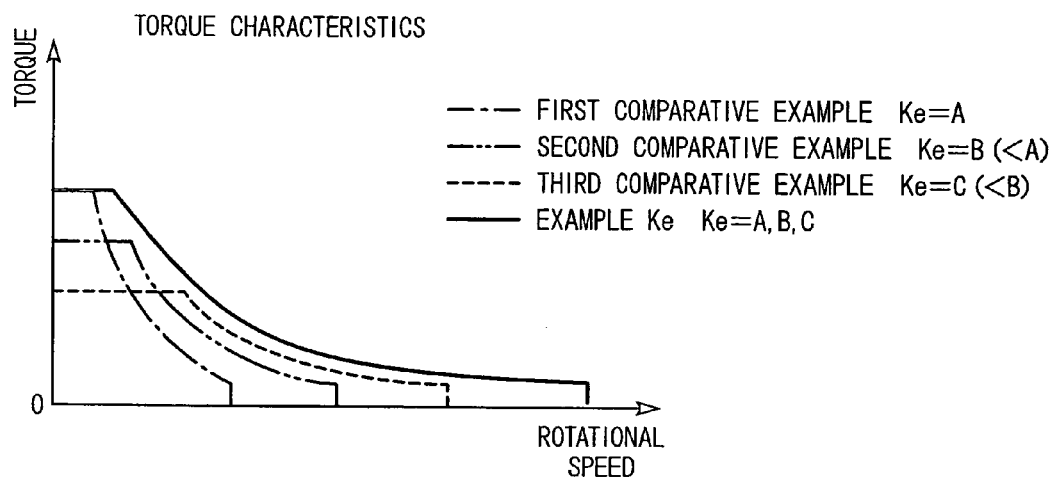
FIG. 8A is a graph showing a relationship between a rotational speed and torque of an electric motor that change in accordance with an induced voltage constant Ke.

Because of this, as in an example shown in FIG. 8A, for example, by making settings such that the induced voltage constant Ke changes on a reducing trend as the rotational speed of the electric motor 10 increases (for example, changes in sequence from A, B (<A), C (<B)), then compared with when the induced voltage constant Ke is not changed (for example, as in first through third comparative examples), the operable range of the torque and rotational speed is enlarged.

Figure 8B:
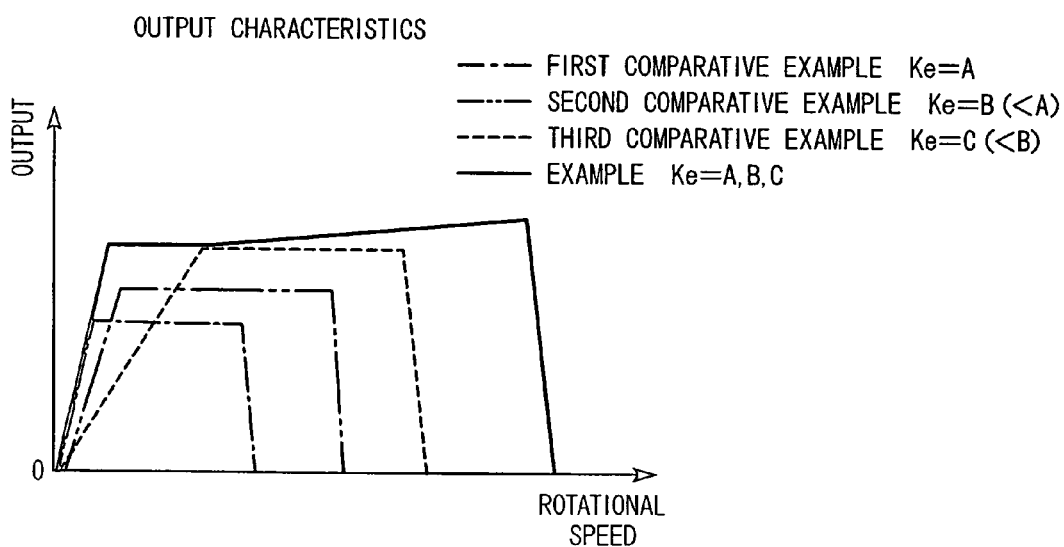
FIG. 8B is a graph showing a relationship between rotational speed and output of an electric motor that change in accordance with an induced voltage constant Ke.

The output from the electric motor 10 is proportional to a value obtained by subtracting the field weakening loss and other losses from the product of the induced voltage constant Ke and the current supplied to the stator coil 13a and the rotational speed (i.e., output ∝ (Ke×current×rotational speed−field weakening loss−other losses)). For example, as is shown in FIG. 8B, in an electric motor 10 in which the induced voltage constant Ke is relatively large, although the operable rotational speed is relatively reduced, the output in the region of relatively low rotational speed increases. In contrast, in an electric motor 10 in which the induced voltage constant Ke is relatively small, although the output in the region of relatively low rotational speed is reduced, operation becomes possible up to a relatively high rotational speed and the output in the region of relatively high rotational speed increases. Namely, the operable region of the output and the rotational speed changes in accordance with the induced voltage constant Ke. Because of this, by making settings such that the induced voltage constant Ke changes on a reducing trend as the rotational speed of the electric motor 10 increases (for example, changes in sequence from A, B (<A), C (<B)), then compared with when the induced voltage constant Ke is not changed (for example, as in the first through third comparative examples), the operable range of the output and rotational speed is enlarged.

The efficiency of the electric motor 10 is proportional to a value obtained by dividing a value obtained by subtracting the copper loss and the field weakening loss and other losses from the input power input into the stator coil 13a by the input power (i.e., efficiency $\propto$ ((input power−copper loss−field weakening loss−other losses)/input power)).

Because of this, between the region of a relatively low rotational speed and the region of an intermediate rotational speed, by selecting a relatively large induced voltage constant Ke, the current that is required in order for the desired torque to be output is reduced and the copper loss is reduced.

In addition, between the region of an intermediate rotational speed and the region of a relatively high rotational speed, by selecting a relatively small induced voltage constant Ke, the field weakening current is reduced and the field weakening loss is reduced.

Figure 9A:
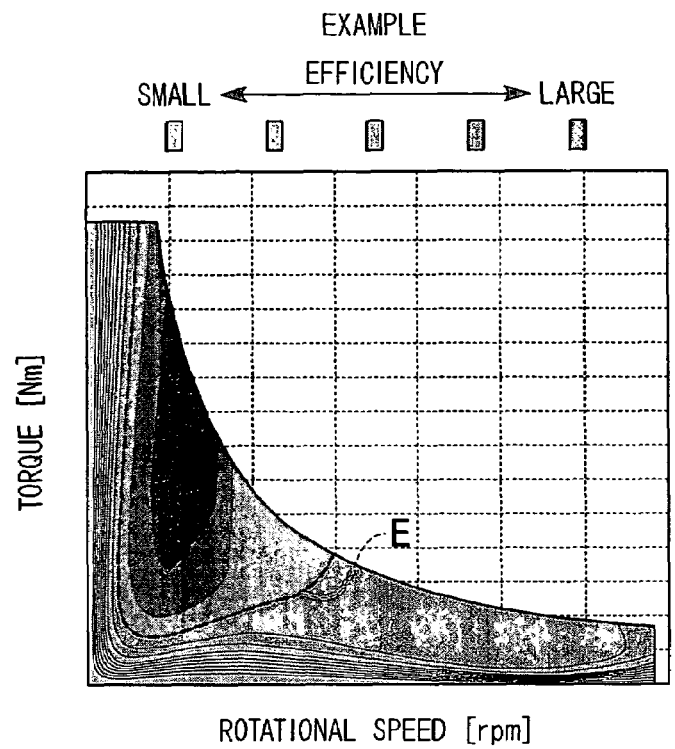
FIG. 9A is a graph showing an operable area and efficiency distribution for a rotational speed and torque of an electric motor that change in accordance with an induced voltage constant Ke in an example.
Figure 9B:
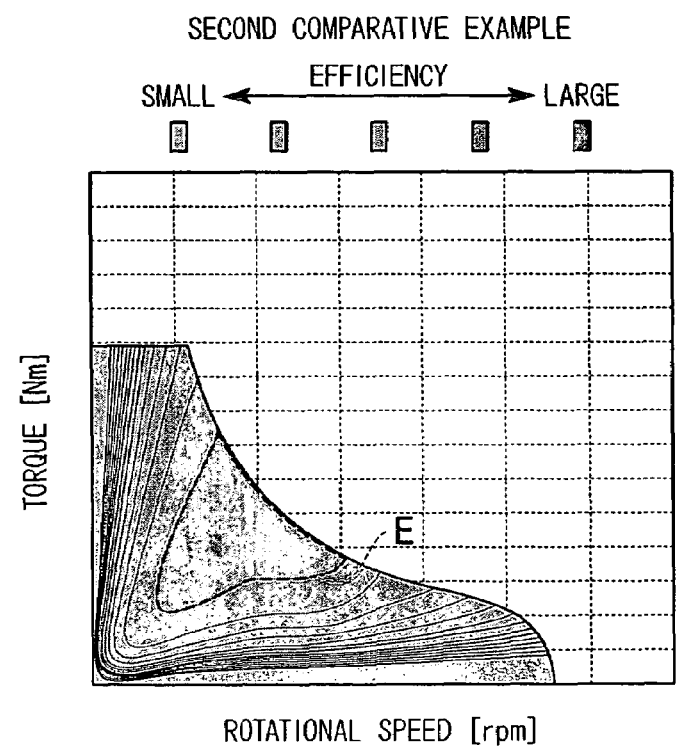
FIG. 9B is a graph showing an operable area and efficiency distribution for a rotational speed and torque of an electric motor that change in accordance with an induced voltage constant Ke in a second comparative example.

As a result, as in the example shown in FIG. 9A, for example, by making settings such that the induced voltage constant Ke changes on a reducing trend as the rotational speed of the electric motor 10 increases, then compared with when the induced voltage constant Ke is not changed (for example, as in the second comparative example shown in FIG. 9B), the rotational speed and the operable range of the rotational speed is enlarged. In addition to this, a high efficiency region E where the efficiency of the electric motor 10 is greater than a predetermined efficiency is also enlarged, and the value of the maximum attainable efficiency is also raised.

The actuator 15 is able to terminate the restricting of the pivoting of the first planetary carrier (C1) 36 around the axis of rotation O. For example, if a fault or the like is detected in the electric motor 10, the restricting of the pivoting of the first planetary carrier (C1) 36 is terminated and the first planetary carrier (C1) 36 is permitted to rotate around the axis of rotation O.

If the restricting of the pivoting of the first planetary carrier (C1) 36 around the axis of rotation O by the actuator 15 is terminated, the first planetary carrier (C1) 36 is able to pivot freely around the axis of rotation O. In this state, the relative positions in the circumferential direction of the inner rotor 11 and the outer rotor 12 are changed by the repelling force between the same magnetic poles of the permanent magnets 11a of the inner rotor 11 and the permanent magnets 12a of the outer rotor 12 or, alternatively, by the attracting force between the opposite magnetic poles of the permanent magnets 11a of the inner rotor 11 and the permanent magnets 12a of the outer rotor 12. The state of the electric motor 10 accordingly changes to a strong field state in which the opposite magnetic poles of the permanent magnets 11a of the inner rotor 11 and the permanent magnets 12a of the outer rotor 12 are made to face each other (namely, the permanent magnets 11a and the permanent magnets 12a are positioned with the same polarity arrangement).

When a command to execute weak field control that has been output from the external control unit 42 or the like is detected, the actuator 15 causes the state of the electric motor 10 to change to a weak field state in which the same magnetic poles of the permanent magnets 11a of the inner rotor 11 and the permanent magnets 12a of the outer rotor 12 are made to face each other (namely, the permanent magnets 11a and the permanent magnets 12a are positioned with the opposite polarity arrangement), and causes the first planetary carrier (C1) 36 to pivot around the axis of rotation O.

The electric motor 10 of the present embodiment is provided with the structure described above. Next, a description will be given with reference made to the drawings of a method of driving the electric motor 10.

Figure 10:
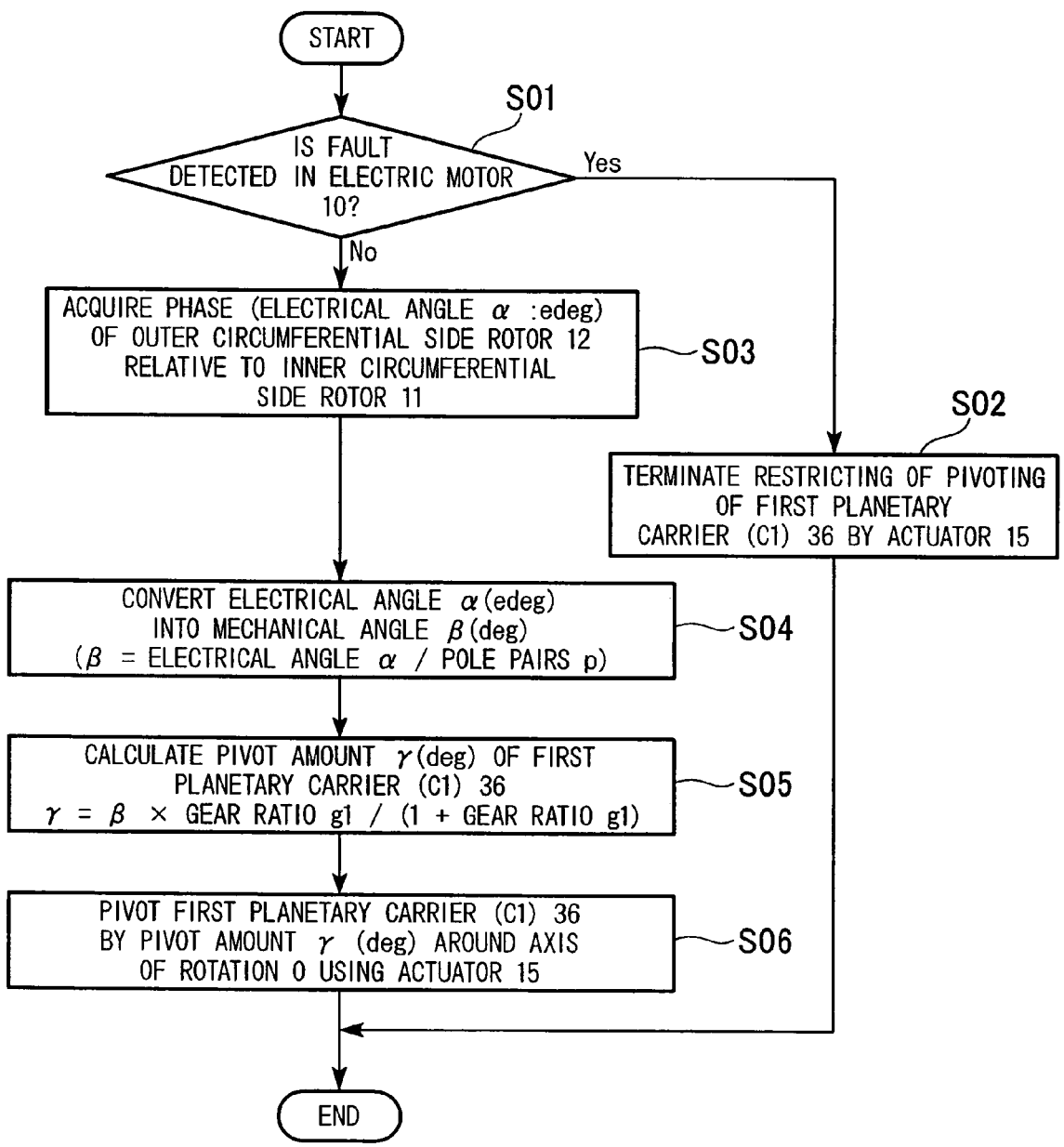
FIG. 10 is a flowchart showing a drive method for an electric motor according to the embodiment of the present invention.

Firstly, in step S01 shown, for example, in FIG. 10, a determination is made as to whether or not a fault has been detected in the electric motor 10.

If the result of this determination is NO, the routine moves to step S03 described below.

If, however, the result of the determination is YES, the routine moves to step S02.

In step S02, the restricting of the pivoting of the first planetary carrier (C1) 36 by the actuator 15 is terminated, and free rotation of the first planetary carrier (C1) 36 around the axis of rotation O is permitted. The processing sequence is then ended.

In step S03, the relative phase (electrical angle $\alpha$: edeg) between the inner rotor 11 and the outer rotor 12 that is detected by, for example, a rotation sensor is acquired.

Next, in step S04, the acquired electrical angle $\alpha$ is converted into a mechanical angle $\beta$ ($=\alpha/p$) in accordance with the pole pairs "p" of the electric motor 10.

Next, in step S05, in accordance with the mechanical angle $\beta$ and the gear ratio g1 of the sun gear (S) 35 relative to the first ring gear (R1) 31, the pivot amount $\gamma$ ($=\beta \times g1/(1+g1)$) when the first planetary carrier (C1) 36 is pivoted around the axis of rotation O is calculated.

In step S06, the first planetary carrier (C1) 36 is pivoted by the pivot amount $\gamma$ around the axis of rotation O by the actuator 15, and the processing sequence is ended.

As has been described above, according to the electric motor 10 of the present embodiment, the permanent magnets 11a are positioned in the circumferential direction in the inner rotor 11, while the permanent magnets 12a are positioned in the circumferential direction in the outer rotor 12, and the respective permanent magnets 11a and 12a are set so that they can be positioned facing each other in the radial directions of the respective rotors 11 and 12. As a result, it is possible to prevent the magnetic flux of the respective permanent magnets 11a and 12a from radiating to surrounding magnetic circuits (for example, to the respective rotor iron cores 21 and 22 and the like). Accordingly, the occurrence of iron loss is suppressed, and, for example, it is possible to efficiently increase or decrease the linkage magnetic flux amount by which the magnetic field flux from the permanent magnets 12a of the outer rotor 12 links with the stator coil 13a using the magnetic field flux from the permanent magnets 11a of the inner rotor 11. In addition, in a strong field state, the torque constant (namely, torque/phase current) of the electric motor 10 can be set to a relatively high value, and the maximum torque value that can be output by the electric motor 10 can be increased without increasing the current loss when the electric motor 10 is in operation and without altering the maximum value of the output current from an inverter (not shown) that controls the supply of current to the stator coil 13a.

As a result of the plurality of first planetary gears 33a that constitute the first planetary gear train 33 and the plurality of second planetary gears 34a that constitute the second planetary gear train 34 being able to rotate around the respective planetary rotation shafts P1 and P2 as meshing with the sun gear (S) 35, which is an idler gear, then irrespective of whether the inner rotor 11 and outer rotor 12 are being operated in synchronization or whether the electric motor 10 is stopped, it is possible to easily alter the relative phase between the inner rotor 11 and the outer rotor 12.

By employing a structure in which the sun gear (S) 35 is shared by both the first planetary gear train 33 and the second planetary gear train 34, friction in the sun gear (S) 35 can be reduced. As a result, irrespective of the rotational speed or torque size of the electric motor 10, the force that is required to restrict the pivoting (namely, to hold it in a predetermined pivot position) or, alternatively, to drive the pivoting of the first planetary carrier (C1) 36 around the axis of rotation O only needs to be larger than the attracting force or repelling force generated between the permanent magnets 11a of the inner rotor 11 and the permanent magnets 12a of the outer rotor 12. The phase can thus be efficiently controlled without a larger force than the torque being output by the electric motor 10 being required as is the case, for example, with a brake actuator.

Moreover, because the actuator 15 is able to pivot the first planetary carrier (C1) 36 without requiring power to be supplied from outside, it is possible to prevent the operating efficiency of the electric motor 10 from deteriorating.

As a result of the predetermined pivot amount when the first planetary carrier (C1) 36 that supports the first planetary gear train 33 is pivoted around the axis of rotation O being set to at least a mechanical angle $\theta$ (°)=(180/p)×g1/(1+g1), the state of the electric motor 10 can be adjusted appropriately in a range between a strong field state in which the permanent magnets 11a of the inner rotor 11 and the permanent magnets 12a of the outer rotor 12 are positioned with the opposite magnetic pole facing each other (namely, the permanent magnets 11a of the inner rotor 11 and the permanent magnets 12a of the outer rotor 12 are positioned with the same polarity arrangement) and a weak field state in which the permanent magnets 11a of the inner rotor 11 and the permanent magnets 12a of the outer rotor 12 are positioned with the same magnetic pole facing each other (namely, the permanent magnets 11a of the inner rotor 11 and the permanent magnets 12a of the outer rotor 12 are positioned with an opposite polarity arrangement).

Because it is possible to continuously change the size of the magnetic field flux that links with the stator coil 13a, it is possible to continuously change the induced voltage constant Ke of the electric motor 10 to an appropriate value. As a result, the rotational speed and torque value at which the electric motor 10 can operate can be altered continuously, and the range of the rotational speed and torque value at which operation is possible can be enlarged. Furthermore, the maximum value of the operating efficiency of the electric motor 10 can be increased, and the high efficiency region where the operating efficiency is greater than a predetermined efficiency can be enlarged.

For example, if a command to execute weak field control in accordance with values such as the rotational speed and power supply voltage of the electric motor 10 is output from the external control unit 42 or the like, then the first planetary carrier (C1) 36 is pivoted around the axis of rotation O such that the electric motor 10 changes to a weak field state in which the permanent magnets 11a of the inner rotor 11 and the permanent magnets 12a of the outer rotor 12 are positioned with the same magnetic pole facing each other. As a result, it is possible to prevent a high voltage device such as, for example, an inverter that controls the supply of power to the stator coil 13a being placed in an over-voltage state.

In the outer rotor 12, by providing the recessed grooves 22a that extend in parallel with the axis of rotation O on the outer circumferential surface 22A of the outer rotor iron core 22 between adjacent outer magnet mounting portions 24 in the circumferential direction, it is possible to suppress the occurrence of magnetic path short-circuiting between the magnetic poles of the permanent magnets 11a of the inner rotor 11 and the permanent magnets 12a of the outer rotor 12 that are not arranged so as to be facing each other.

According to the method of driving the electric motor 10 of the present embodiment, irrespective of whether the inner rotor 11 and the outer rotor 12 are operating in synchronization with each other or whether the electric motor 10 is stopped, then it is possible to easily set the state of the electric motor 10 appropriately in a range between a weak field state in which the permanent magnets 11a of the inner rotor 11 and the permanent magnets 12a of the outer rotor 12 are positioned with the same magnetic pole facing each other and a strong field state in which the permanent magnets 11a of the inner rotor 11 and the permanent magnets 12a of the outer rotor 12 are positioned with the opposite magnetic pole facing each other.

When a fault is detected in the electric motor 10 or the like, the restricting of the pivoting of the first planetary carrier (C1) 36 around the axis of rotation O by the actuator 15 is terminated and the first planetary carrier (C1) 36 is able to pivot freely around the axis of rotation O. As a result, the relative positions in the circumferential direction of the inner rotor 11 and the outer rotor 12 are changed by the repelling force between the same magnetic poles of the permanent magnets 11a of the inner rotor 11 and the permanent magnets 12a of the outer rotor 12 or, alternatively, by the attracting force between the opposite magnetic poles of the permanent magnets 11a of the inner rotor 11 and the permanent magnets 12a of the outer rotor 12. The state of the electric motor 10 accordingly changes to a strong field state in which the opposite magnetic poles of the permanent magnets 11a of the inner rotor 11 and the permanent magnets 12a of the outer rotor 12 are made to face each other.

Accordingly, when, for example, the electric motor 10 is mounted in a vehicle as a driving source, it is possible to secure the desired output to enable the vehicle to start moving or continue traveling irrespective of the fault state of the electric motor 10.

Figure 11:
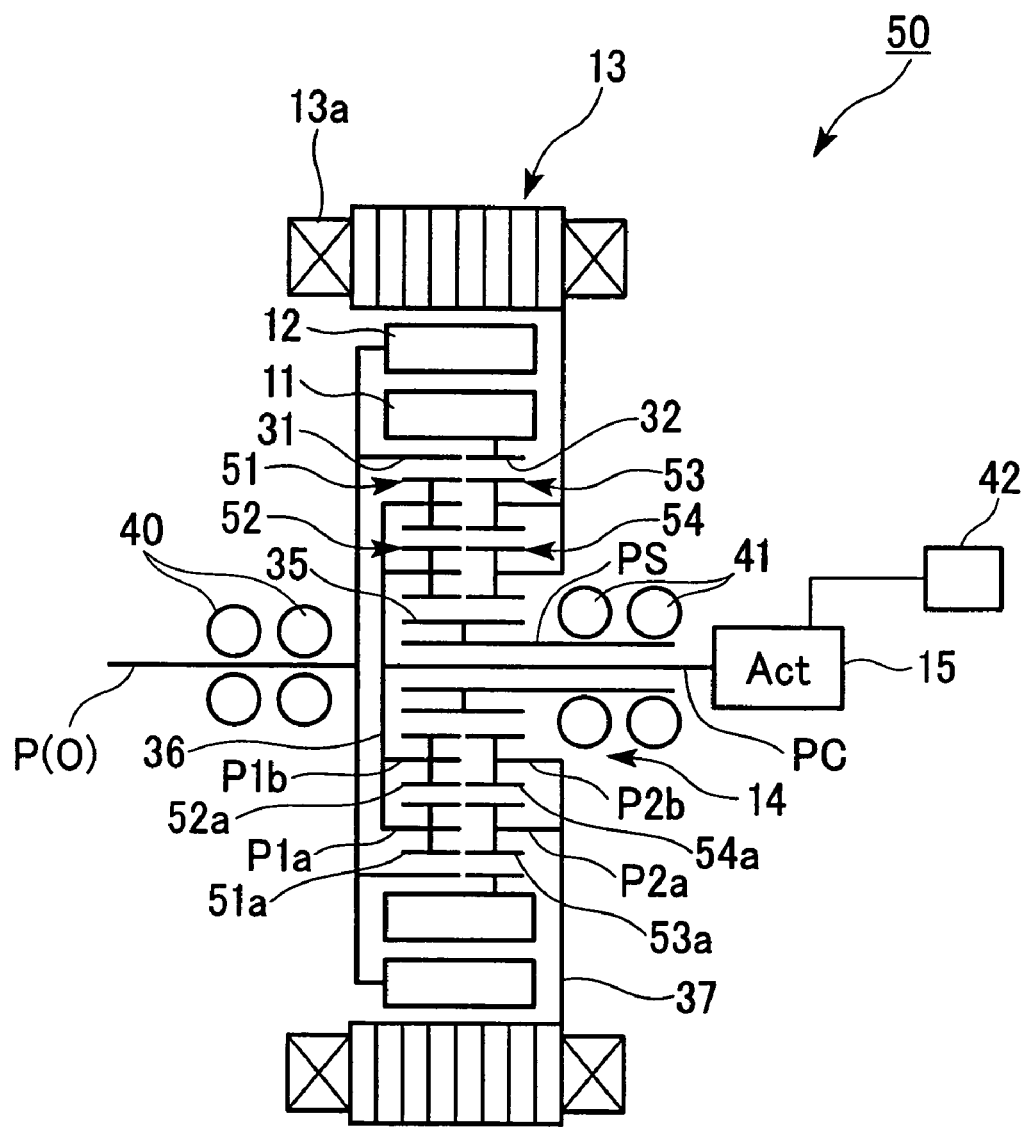
FIG. 11 is a view showing in typical form a structure of an electric motor according to a variant example of an embodiment of the present invention.

The planetary gear mechanism 14 is formed as a single pinion type of planetary gear mechanism in the above described embodiment; however, as in the case of an electric motor 50 according to a variant example of the above described embodiment that is shown in FIG. 11, the planetary gear mechanism 14 may also be a double pinion type of planetary gear mechanism.

The electric motor 50 according to this variant example differs from the electric motor 10 according to the above described embodiment in that two trains of first planetary gear trains 51 and 52 that mesh with each other are positioned between the first ring gear (R1) 31 and the sun gear (S) 35, and in that two trains of second planetary gear trains 53 and 54 that mesh with each other are positioned between the second ring gear (R2) 32 and the sun gear (S) 35.

Namely, of the two trains of first planetary gear trains 51 and 52 that mesh with each other, the one (outer side) first planetary gear train 51 meshes with the first ring gear (R1) 31 and the other (inner side) first planetary gear 52 meshes with the sun gear (S) 35.

Of the two trains of second planetary gear trains 53 and 54 that mesh with each other, the one (outer side) second planetary gear train 53 meshes with the second ring gear (R2) 32 and the other (inner side) second planetary gear 54 meshes with the sun gear (S) 35.

The first planetary carrier (C1) 36 supports the plurality of first planetary gears 51a that constitute the outer side first planetary gear train 51 such that they can rotate around respective first planetary rotation shafts P1a, and supports the plurality of first planetary gears 52a that constitute the inner side first planetary gear train 52 such that they can rotate around respective first planetary rotation shafts P1b. In addition, the first planetary carrier (C1) 36 is able to pivot around the axis of rotation O.

The second planetary carrier (C2) 37 supports the plurality of second planetary gears 53a that constitute the outer side second planetary gear train 53 such that they can rotate around respective second planetary rotation shafts P2a, and supports the plurality of second planetary gears 54a that constitute the inner side second planetary gear train 54 such that they can rotate around respective second planetary rotation shafts P2b. In addition, the second planetary carrier (C2) 37 is fixed to the stator 13.

Each of the planetary gears 51a, 52a, 53a, and 54a is formed with substantially the same gear shape.

Figure 12:
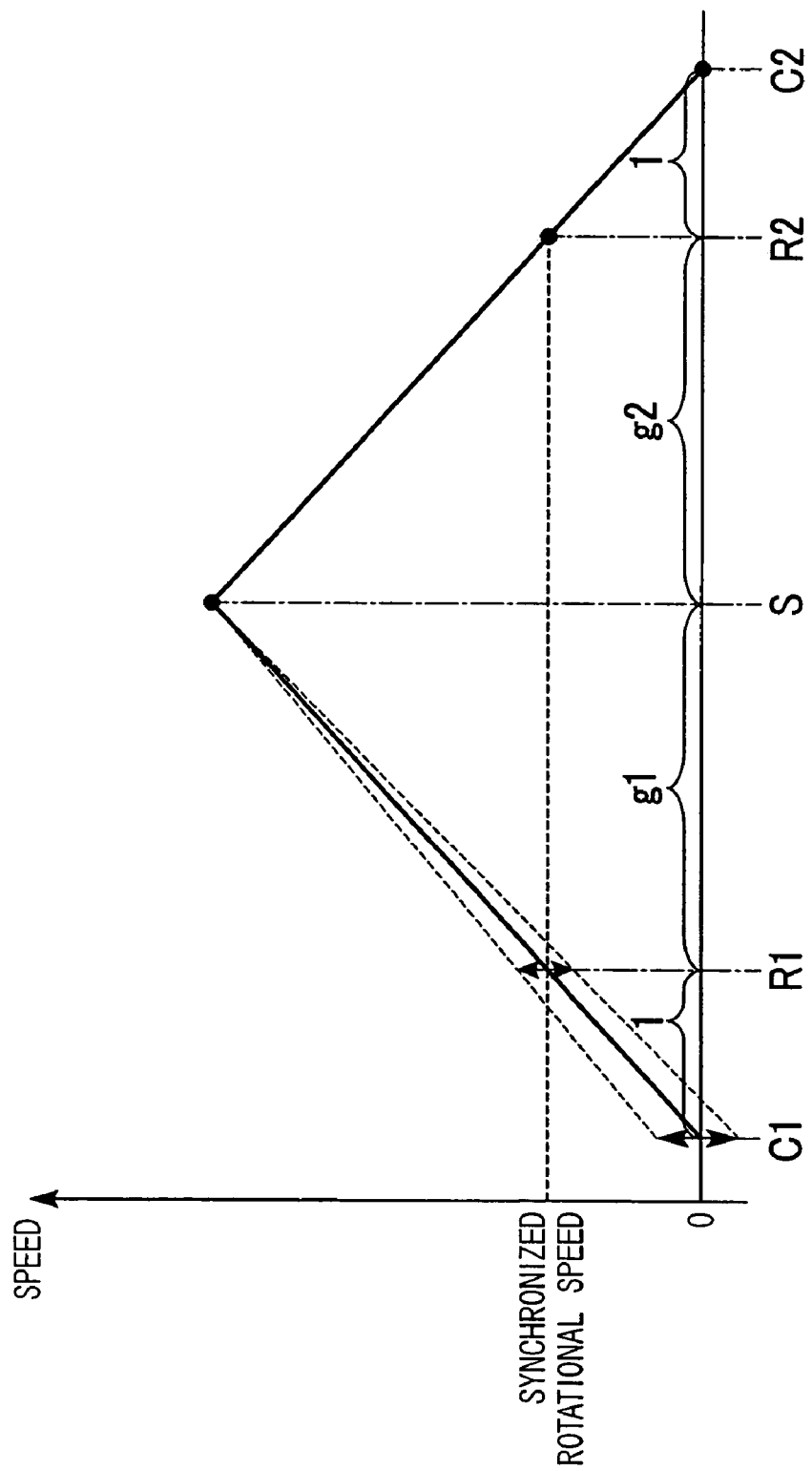
FIG. 12 is a velocity diagram showing a planetary gear mechanism according to a variant example of an embodiment of the present invention.

In the electric motor 50 according to this variant example, by providing the two trains of first planetary gear trains 51 and 52 and the two trains of second planetary gear trains 53 and 54, for example, as in the state of rotation of the sun gear (S) 35 shown in FIG. 12, the sun gear (S) 35 rotates in the same direction as the inner rotor 11 and outer rotor 12.

According to the electric motor 50 of this variant example, the rotation directions of the inner rotor 11 and outer rotor 12 and the sun gear (S) 35 can be set to the same direction. Accordingly, when the electric motor 10 is mounted in a vehicle as a driving source, for example, it is possible to prevent a power transmission mechanism such as a gearbox or the like from being more complex even if the output shaft of the electric motor 10 is connected to the sun gear (S) 35 in addition to the inner rotor 11 or the outer rotor 12.

Because the pivot amount of the outer rotor 12 is less than the pivot amount of the first planetary carrier (C1) 36, it is possible to improve the resolution when controlling the pivot amount of the outer rotor 12.

In the above described embodiment, a structure is employed in which the first planetary carrier (C1) 36 is able to pivot around the axis of rotation O and the second planetary carrier (C2) 37 is fixed to the stator 13; however, the present invention is not limited to this. For example, it is also possible to employ a structure in which the second planetary carrier (C2) 37 is able to pivot around the axis of rotation O and the first planetary carrier (C1) 36 is fixed to the stator 13.

In the above described embodiment, a structure is employed in which the recessed grooves 22a that extend in parallel with the axis of rotation O are provided on the outer circumferential surface 22A of the outer rotor iron core 22 between adjacent outer magnet mounting portions 24 in the circumferential direction, however, the present invention is not limited to this. For example, it is also possible to form recessed grooves 22b that extend in parallel with the axis of rotation O on an inner circumferential surface 22B of the outer rotor iron core 22 between adjacent outer magnet mounting portions 24 in the circumferential direction. Thereby, it is possible to suppress to an even greater extent the occurrence of magnetic path short-circuiting between the magnetic poles of the permanent magnets 11a of the inner rotor 11 and the permanent magnets 12a of the outer rotor 12 that are not arranged so as to be facing each other.

In the above described embodiment, a hydraulic pump is provided as the actuator 15; however, the present invention is not limited to this and it is also possible, for example, for an electric motor or the like to be used instead.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An electric motor comprising:
   a substantially toroidal inner circumferential side rotor and an outer circumferential side rotor that are positioned so as to have the same axis of rotation and are provided with permanent magnets that are arranged in a circumferential direction;
   a planetary gear mechanism including:
      a first ring gear that is formed coaxially and integrally with the outer circumferential side rotor;
      a second ring gear that is formed coaxially and integrally with the inner circumferential side rotor;
      a first planetary gear that meshes with the first ring gear;
      a second planetary gear that meshes with the second ring gear;
      a sun gear that meshes with the first planetary gear and the second planetary gear; and
      a first planetary carrier that rotatably supports one of the first planetary gear and the second planetary gear and that is able to pivot around the axis of rotation; and
   a pivot device that is connected to the first planetary carrier and that, by pivoting the first planetary carrier by a predetermined pivot amount around the axis of rotation, alters a relative phase between the inner circumferential side rotor and the outer circumferential side rotor.

2. The electric motor according to claim 1, further comprising a second planetary carrier that rotatably supports the other one of the first planetary gear and the second planetary gear, and the second planetary carrier is fixed to a stator.

3. The electric motor according to claim 1, wherein:
   the first planetary gear and the second planetary gear are each formed by a single gear train; and
   the planetary gear mechanism is a single pinion type of planetary gear mechanism.

4. The electric motor according to claim 1, wherein:
   the first planetary gear and the second planetary gear are each formed by two gear trains that mesh with each other; and
   the planetary gear mechanism is a double pinion type of planetary gear mechanism.

5. The electric motor according to claim 1, wherein the pivot device is an actuator that causes the first planetary carrier to pivot or restricts the pivoting of the first planetary carrier using hydraulic or electric power.

6. The electric motor according to claim 1, wherein the predetermined pivot amount is a mechanical angle $\theta$ (°)= $(180/p) \times g/(1+g)$ that is based on a pole pairs "p" of the electric motor and a gear ratio "g" of the sun gear to one of the first ring gear and the second ring gear.

7. The electric motor according to claim 1, wherein, as a result of the first planetary carrier being pivoted by the pivot device, a state of the electric motor is set to an appropriate state ranging between a weak field state in which the permanent magnets of the inner circumferential side rotor and the permanent magnets of the outer circumferential side rotor are positioned with the same magnetic pole facing each other and a strong field state in which the permanent magnets of the inner circumferential side rotor and the permanent magnets of the outer circumferential side rotor are positioned with the opposite magnetic pole facing each other.

8. The electric motor according to claim 1, further comprising a terminating device that terminates restricting by the pivot device of the pivoting of the first planetary carrier around the axis of rotation, and allows the first planetary carrier to pivot around the axis of rotation until the state of the electric motor reaches a strong field state in which the permanent magnets of the inner circumferential side rotor and the permanent magnets of the outer circumferential side rotor are positioned with the opposite magnetic pole facing each other.

9. The electric motor according to claim 1, wherein the planetary gear mechanism is positioned in a hollow portion on an inner circumferential side of the inner circumferential side rotor.

10. The electric motor according to claim 1, wherein, as a result of the pivot device pivoting the first planetary carrier, the inner circumferential side rotor and the outer circumferential side rotor are pivoted to appropriate positions between a position where the same magnetic poles of the each permanent magnet face each other and a position where the opposite magnetic poles of each permanent magnet face each other.

* * * * *

UNITED STATES PATENT AND TRADEMARK OFFICE
CERTIFICATE OF CORRECTION

PATENT NO. : 7,626,298 B2  Page 1 of 1
APPLICATION NO. : 11/604329
DATED : December 1, 2009
INVENTOR(S) : Hirofumi Atarashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this

Second Day of November, 2010

David J. Kappos
*Director of the United States Patent and Trademark Office*